United States Patent [19]
Sato et al.

[11] Patent Number: 5,061,843
[45] Date of Patent: Oct. 29, 1991

[54] CIRCUIT FOR PROCESSING ANALOG SIGNAL OBTAINED BY SCANNING BAR CODE

[75] Inventors: Shinichi Sato, Kawasaki; Kazumasa Moriya, Urawa, both of Japan

[73] Assignee: Fujitsu Limited, Kawasaki, Japan

[21] Appl. No.: 530,326

[22] Filed: May 30, 1990

[30] Foreign Application Priority Data

May 30, 1989 [JP] Japan .................................. 1-136501

[51] Int. Cl.$^5$ ............................................ G06K 7/10
[52] U.S. Cl. ................................ 235/462; 235/463; 235/472
[58] Field of Search ............... 235/449, 462, 463, 472; 250/566

[56] References Cited

U.S. PATENT DOCUMENTS

| | | | |
|---|---|---|---|
| 3,716,699 | 2/1973 | Eckert, Jr. et al. | 235/463 |
| 4,000,397 | 12/1976 | Hebert et al. | 235/61.11 |
| 4,219,152 | 8/1980 | Couch et al. | 235/463 |
| 4,246,473 | 1/1981 | Maussion | 235/463 |

FOREIGN PATENT DOCUMENTS

55-65101 5/1980 Japan.
63-127386 5/1988 Japan.

*Primary Examiner*—Harold Pitts
*Attorney, Agent, or Firm*—Staas & Halsey

[57] ABSTRACT

A circuit for processing an analog electric signal which is obtained from a photoelectric transformation of a reflected light when scanning a bar code by a light beam. The circuit includes a differentiating circuit for differentiating the analog electric signal, a delay circuit for delaying the output of the differentiating circuit; a first gate signal generating circuit for generating a first gate signal which is active when the level of the output of the differentiating circuit is higher than a positive threshold, a second gate signal generating circuit for generating a second gate signal which is active when the level of the output of the differentiating circuit is lower than a negative threshold, and a comparing circuit for comparing the output of the differentiating circuit with the output of the delay circuit. The output of the comparing circuit being one binary level when the level of the output of the differentiating circuit is higher than the level of the output of the delay circuit, and the output of the comparing circuit is the opposite binary level when the level of the output of the differentiating circuit is lower than the level of the output of the delay circuit. A first gate circuit for detecting transition points in the output of the comparing circuit when the first gate signal is active, and a second gate circuit for detecting transition points in the output of the comparing circuit when the second gate signal is active, are also provided.

8 Claims, 5 Drawing Sheets

CIRCUIT FOR PROCESSING ANALOG SIGNAL OBTAINED BY SCANNING BAR CODE

BACKGROUND OF THE INVENTION

(1) Field of the Invention

The present invention relates to a circuit for processing an analog signal which is obtained from a photoelectric transformation of a reflected light when scanning a bar code by a light beam. Bar codes are used as the Universal Product Code, the Universal Vender Marking, the European Article Number, and the Japanese Article Number for source marking of commodities. The bar codes consist of series of parallel dark bars and light spaces between the dark bars. The widths of the dark bars and the light spaces are generally different for defining various characters. To read the bar codes, an apparatus called a bar code reader is provided. The bar code is scanned by scanning a light beam which is output from the bar code reader, and a variation of the intensity of reflected light from the bar code is detected in the bar code reader. The reflected light is first transformed to an analog electric signal. The analog signal is transformed to a binary signal having two levels respectively corresponding to the above-mentioned dark bars and light spaces in the bar code, to detect the dark bars and light spaces. Since the above source marking is defined by the widths of the dark bars and the light spaces, it is required to exactly detect the transition points between the dark bars and the light spaces, i.e., the transition points between the high level and the low level.

(2) Description of the Related Art

U.S. Pat. No. 4,000,397 discloses a technique wherein the analog signal responding to the intensity of the reflected light is differentiated twice. FIG. 1 shows the construction of a conventional circuit for processing the analog signal which is obtained by the above scanning of the bar code and the photoelectric transformation from the reflected light in the bar code reader. FIG. 2 shows the timing of the operation of the construction of FIG. 1

In FIG. 1, reference numeral 1 denotes a bar code, 2 denotes a light receiving device, 3, 6, and 9 each denote an amplifier, 4 and 7 each denote a differentiating circuit, 5 denotes a filter circuit, 71 denotes a capacitor, 72 and 81 each denote a resistor, 8, 16, and 17 each denote a comparator, 10 denotes a slice signal generation circuit, 11 denotes a DC voltage level detecting circuit, 12 denotes a peak hold circuit, 13 denotes a discharge circuit, 14 denotes an inverting amplifier, 18 denotes an inverter, 20 and 21 each denote an AND circuit, 22 denotes an RS-type flip-flop circuit, and 23 denotes a voltage dividing circuit.

The reflected light from the bar code is transformed to an analog electric signal as shown by "a" in FIG. 2, where the amplitude of the analog electric signal corresponds to the intensity of the reflected light which changes between the dark bar portions and the light space portions. The analog electric signal is amplified in the amplifier 3, and is differentiated in the differentiating circuit 4 to obtain transition points of the analog electric signal as peaks of the differentiated signal. The differentiated signal is shown by "b" in FIG. 2. The filter circuit 5 is provided to eliminate the components of the frequency ranges outside of the frequency ranges of the required signal from the differentiated signal. The output of the filter circuit 5 is amplified in the amplifier 6 and is differentiated again in a differentiating circuit formed by the capacitor 71 and the resistor 72. The twice-differentiated signal is shown in FIG. 2, and is denoted by "e". Thus, the above transition points are exactly obtained as zero-cross points of the twice-differentiated signal. The twice-differentiated signal "e" is compared with a threshold level of ground in the comparator 8 to obtain the zero cross points of the twice-differentiated signal as leading edges and trailing edges. The output of the comparator 8 is shown by "f" in FIG. 1.

The above zero-cross points do not necessarily correspond to the transition points of the analog electric signal "a". To pick up the zero-cross points corresponding to the transition points, gate signals are generated in the slice signal generation circuit 10 and the comparators 16 and 17, as explained below.

The above output of the filter circuit 5 is also amplified in the amplifier 9, and is supplied to the slice signal generation circuit 10 and the comparators 16 and 17. The DC voltage level detecting circuit 11 detects an average DC voltage level of the output of the amplifier 9, and the detected DC voltage level (which is shown by "t" in FIG. 2) is supplied to the discharge circuit 13, the voltage dividing circuit 23, and the inverting amplifier 14. The peak hold circuit 12 detects the peak level of the output of the amplifier 9, and the detected peak level is supplied to the discharge circuit 13. A voltage which is equal to the difference between the detected peak level and the detected DC voltage level is charged in a capacitor (not shown) in the discharge circuit 13, and the charged voltage is slowly discharged. The above outputs from the discharge circuit 13 are shown by "u" in FIG. 2. Then, the voltage charged in the capacitance is output from the discharge circuit 13 to the voltage dividing circuit 23, and a half of the voltage of the output of the discharge circuit 13 is output from the voltage dividing circuit 23. The above average DC voltage level is used as a reference level in the voltage dividing operation in the voltage dividing circuit 23. The output of the voltage dividing circuit 23 is supplied to the circuit 15 as a positive slice level, and is also supplied to the inverting amplifier 14. The inverting amplifier 14 inverts the polarity of the output of the voltage dividing circuit 23 using the output of the average DC voltage level as a reference voltage. The output of the inverting amplifier 14 is applied to the positive input terminal of the comparator 16 as a negative slice level. The above output of the voltage dividing circuit 23 is applied to the negative input terminal of the comparator 17. The above outputs from the voltage dividing circuit 23 and the inverting circuit 14 (the positive and negative slice levels) are respectively shown by "v" and "w" in FIG. 2.

The comparator 16 receives the output of the amplifier 9 at the negative input terminal, and the comparator 17 receives the output of the amplifier 9 at the positive input terminal. The output of the comparator 17 is positive only when the level of the output of the amplifier 9 (the once-differentiated signal) is higher than the positive slice level "v", and the output of the comparator 16 is positive only when the level of the output of the amplifier 9 (the once-differentiated signal) is lower than the negative slice level "w". The output of the comparator 17 provides a gate signal to pick up rising points of the output of the amplifier 3 (the aforementioned analog electric signal), and is shown by "h" in FIG. 2. The output of the comparator 16 provides the other gate signal to pick up falling points of the output of the amplifier 3 (the aforementioned analog electric signal), and is shown by "g" in FIG. 2.

The gate signals "h" and "g" are respectively applied to one of the input terminals of the AND circuits 21 and 20. The above output "f" of the comparator 8 is applied to the other input terminal of the AND circuit 21. On other hand, the output "f" of the comparator 8 is inverted in the inverter 18, and the inverted signal is applied to the other input terminal of the AND circuit 20. The outputs of the AND circuits 20 and 21 are respectively shown by "i" and "j" in FIG. 2. Thus, rising zero-cross points of the twice-differentiated signal "f" corresponding to the negative peaks of the analog electric signal "a" are obtained as the leading edges of the output of the AND circuit 20. Falling zero-cross points of the twice-differentiated signal "f" corresponding to the positive peaks of the analog electric signal "a" are obtained as the leading edges of the output of the AND circuit 21. The outputs of the AND circuit 21 and 20 are respectively applied to the set input terminal S and the reset input terminal R of the RS-type flip-flop circuit 22. Thus, the Q-output of the RS-type flip-flop circuit 22 rises exactly when the analog electric signal rises, and falls exactly when the analog electric signal falls.

However, the above conventional circuit for reprocessing an analog electric signal obtained from the reflected light signal from a bar code responding to the scanning light, suffers much from the high frequency noise due to the double differentiation because the differentiating operation decreases the amplitude of the signal components. However, high frequency noise passes the differentiating circuit without much decrease in its amplitude. Thus, the double differentiation greatly deteriorates the S/N ratio in the processed signal and the accuracy in detecting the transition points in the analog electric signal from the light receiving device, i.e., the widths of the dark bars and light spaces.

For example, when a high frequency noise as shown by "N" in FIG. 2, overlaps the processed signal, the noise component N passes through the comparator 8. The output "f" of the comparator 8 suffers from the noise as shown in FIG. 2, and changes the position of the zero cross point in the output "f" of the comparator 8. In the example shown in FIG. 2, the error caused by the noise in the output "f" of the comparator 8 is shown by "T".

SUMMARY OF THE INVENTION

An object of the present invention is to provide a circuit for processing an analog signal which is obtained by scanning a bar code, whereby transition points of the intensity of a reflected light from a bar code can be exactly detected with a minimum effect noise which overlaps the processed signal.

According to the first aspect of the present invention, there is provided a circuit for processing an analog electric signal which is obtained from a photoelectric transformation of a reflected light when scanning a bar code by a light beam, containing a differentiating circuit, a delay circuit, a first gate signal generating circuit, a second gate signal generating circuit, a comparing circuit, a first gate circuit, and a second gate circuit. The differentiating circuit differentiates the analog electric signal. The delay circuit delays the output of the differentiating circuit. The first gate signal generating circuit generates a first gate signal which is active when the level of the output of the differentiating circuit is higher than a positive threshold. The second gate signal generating circuit generates a second gate signal which is active when the level of the output of the differentiating circuit is lower than a negative threshold. The comparing circuit compares the output of the differentiating circuit with the output of the delay circuit. The output of the comparing circuit is one binary level when the level of the output of the differentiating circuit is higher than the level of the output of the delay circuit, and the output of the comparing circuit is the opposite binary level when the level of the output of the differentiating circuit is lower than the level of the output of the delay circuit. The first gate circuit detects transition points in the output of the comparing circuit when the first gate signal is active. The second gate circuit detects transition points in the output of the comparing circuit when the second gate signal is active.

According to the second aspect of the present invention, there is provided a circuit for processing an analog electric signal which is obtained from a photoelectric transformation of a reflected light when scanning a bar code by a light beam, containing a differentiating circuit, an integrating circuit, a first gate signal generating circuit, a second gate signal generating circuit, a comparing circuit, a first gate circuit, and a second gate circuit. The differentiating circuit differentiates the analog electric signal. The integrating circuit integrates the output of the differentiating circuit. The first gate signal generating circuit generates a first gate signal which is active when the level of the output of the differentiating circuit is higher than a positive threshold. The second gate signal generating circuit generates a second gate signal which is active when the level of the output of the differentiating circuit is lower than a negative threshold. The comparing circuit compares the output of the differentiating circuit with the output of the integrating circuit, where the output of the comparing circuit is one binary level when the level of the output of the differentiating circuit is higher than the level of the output of the integrating circuit, and the output of the comparing circuit is the opposite binary level when the level of the output of the differentiating circuit is lower than the level of the output of the integrating circuit. The first gate circuit detects transition points in the output of the comparing circuit when the first gate signal is active. The second gate circuit detects transition points in the output of the comparing circuit when the second gate signal is active.

DESCRIPTION OF THE PREFERRED EMBODIMENTS

Figure 3:
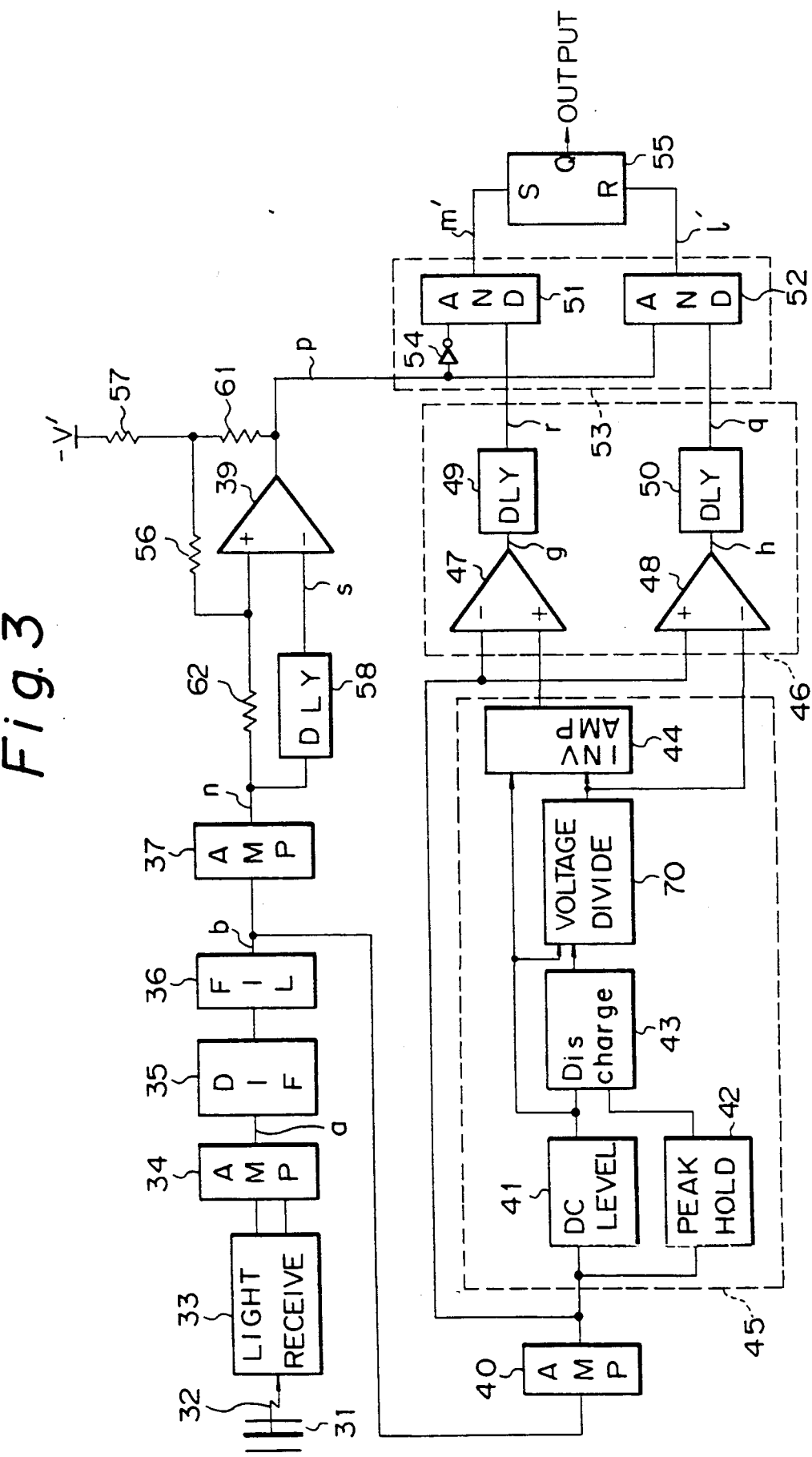
FIG. 3 is a block diagram of a first embodiment of the present invention.
Figure 4:
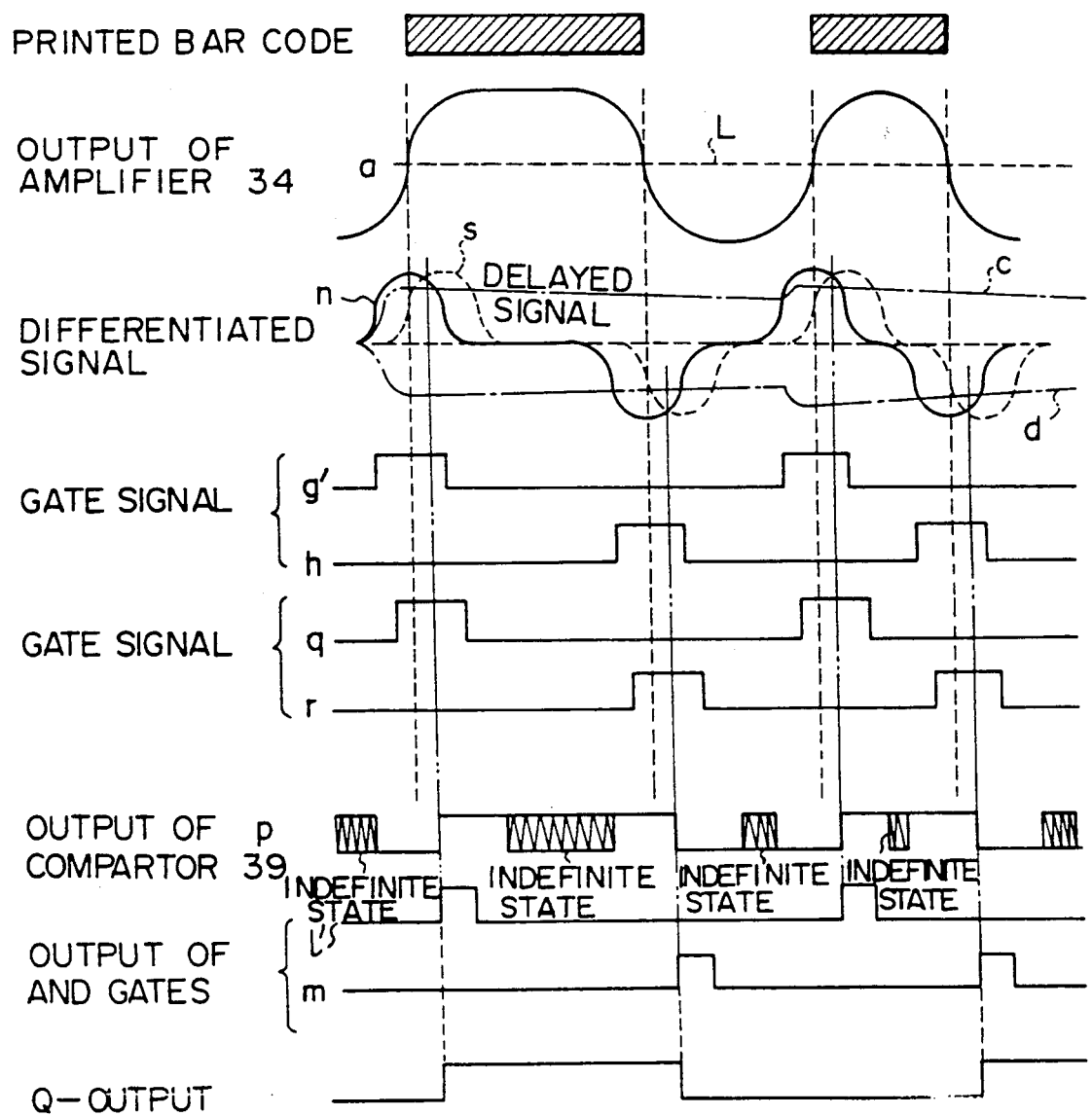
FIG. 4 is timing diagram of the operation of the circuit shown in FIG. 3.

FIG. 3 is a block diagram of the first embodiment of the present invention, and FIG. 4 is a timing diagram of the operation of the construction of FIG. 3.

In FIG. 3, reference numeral 33 denotes a light receiving device, 34, 37 and 40 each denote an amplifier, 35 denotes a differentiating circuit, 36 denotes a filter circuit, 56, 57, 61, and 62 each denote a resistor, 39, 47 and 48 each denote a comparator, 45 denotes a slice signal generation circuit, 41 denotes a DC voltage level detecting circuit, 42 denotes a peak hold circuit, 43 denotes a discharge circuit, 44 denotes an inverting amplifier, 49, 50 and 58 each denote a delay circuit, 51 and 52 each denote an AND circuit, 54 denotes an inverter, 55 denotes an RS-type flip-flop circuit, and 70 denotes a voltage dividing circuit. The construction including the light receiving device 33, the amplifiers 34, 37, and 40, the differentiating circuit 35, the filter circuit 36, the slice signal generation circuit 45, and the comparators 47, 48, is similar to the conventional construction consisting of the light receiving device 2, the amplifiers 3, 6, and 9, the differentiating circuit 4, the filter circuit 5, the slice signal generation circuit 10, and the comparators 16 and 17.

In the first embodiment of the present invention, the output of the amplifier 37 (once-differentiated signal) is applied to the positive input terminal of the comparator 39 and the delay circuit 58. The output of the delay circuit 58 is applied to the negative input terminal of the comparator 39 through the resistor 62. In the comparator 39, the output terminal is connected to a negative voltage source −V′ through a series connection of the resistors 57 and 61. The connecting point between the resistors 57 and 61 is connected to the positive input terminal of the comparator 39 through the resistor 56. The series connection between the resistors 57 and 61 provides a voltage dividing circuit between the output voltage of the comparator 39 and the negative voltage source −V′ and the divided voltage is applied through the resistor 56 to the positive input of the comparator 39. The resistance values of the resistors 56, 57, and 61 and the voltage −V′ are so determined that the voltage of the connecting point between the resistors 57 and 61 is +2 V when the output of the comparator 39 is the high level (+5 V), and is −2 V when the output of the comparator 39 is the low level (0V). The above connections using the resistors 56, 57, and 61 provide a positive bias to the positive input when the output is the high level (+5 V), and the connection between the negative voltage source V′ and the positive input terminal gives a negative bias when the output is the low level (0V). That is, these connections generate a characteristic of hysteresis between the inputs and the output, and make the operation of the comparator 39 stable against variations of the inputs such as noise. In FIG. 4, the output of the amplifier 37 is shown by "n", and the output of the delay circuit 58 is shown by "s". The output of the comparator 39 is the high level when the level of the output "n" of the amplifier 37 is higher than the level of the output "s" of the delay circuit 58. The output of the comparator 39 is the low level when the level of the output "n" of the amplifier 37 is lower than the level of the output "s" of the delay circuit 58. The output of the comparator 39 is shown by "p" in FIG. 4.

In the circuit of FIG. 3, the delay circuits 49 and 50 are provided in the next stages of the comparators 47 and 48, respectively. This corresponds to the delay in the output p of the comparator 39 which is caused by the insertion of the delay circuit 58, as shown in FIG. 4. The outputs of the delay circuits 49 and 50 are respectively shown by "r" and "q" in FIG. 4. The output "r" of the delay circuit 49 is applied to one of the input terminals of the AND circuit 51, and the output "q" of the delay circuit 50 is applied to one of the input terminals of the AND circuit 52. The AND circuit 51 receives the above output "p" of the comparator 39 through the inverter 54 at the other one of its input terminals. The AND circuit 52 receives the output "p" at the other one of its input terminals. The outputs of the AND circuits 51 and 52 are respectively shown by "m" and "l" in FIG. 4.

Thus, rising points of the output "a" of the amplifier 34 are obtained as the leading edges of the output of the AND circuit 51, and falling points of the output "a" are obtained as the leading edges of the output of the AND circuit 52. The outputs of the AND circuits 51 and 52 are respectively applied to the set input terminal S and the reset input terminal R of the RS-type flip-flop circuit 55. Thus, the Q-output of the RS-type flip-flop circuit 55 rises exactly when the output "a" of the amplifier 34 rises, and falls exactly when the output "a" falls.

Figure 1:
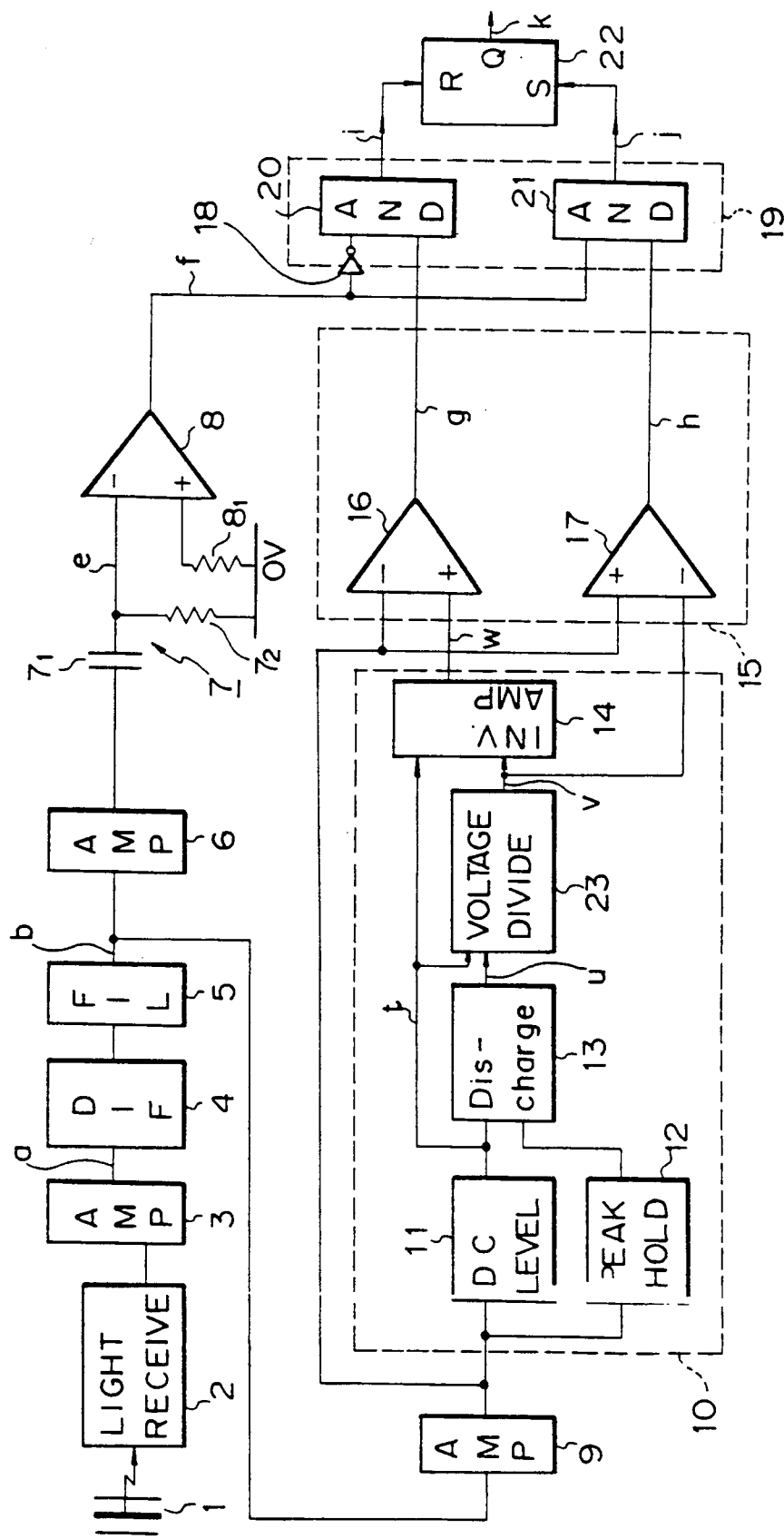
FIG. 1 block diagram of a conventional circuit for processing an analog signal which is obtained by a scanning a bar code and reception of reflected light in a bar code reader.
Figure 2:
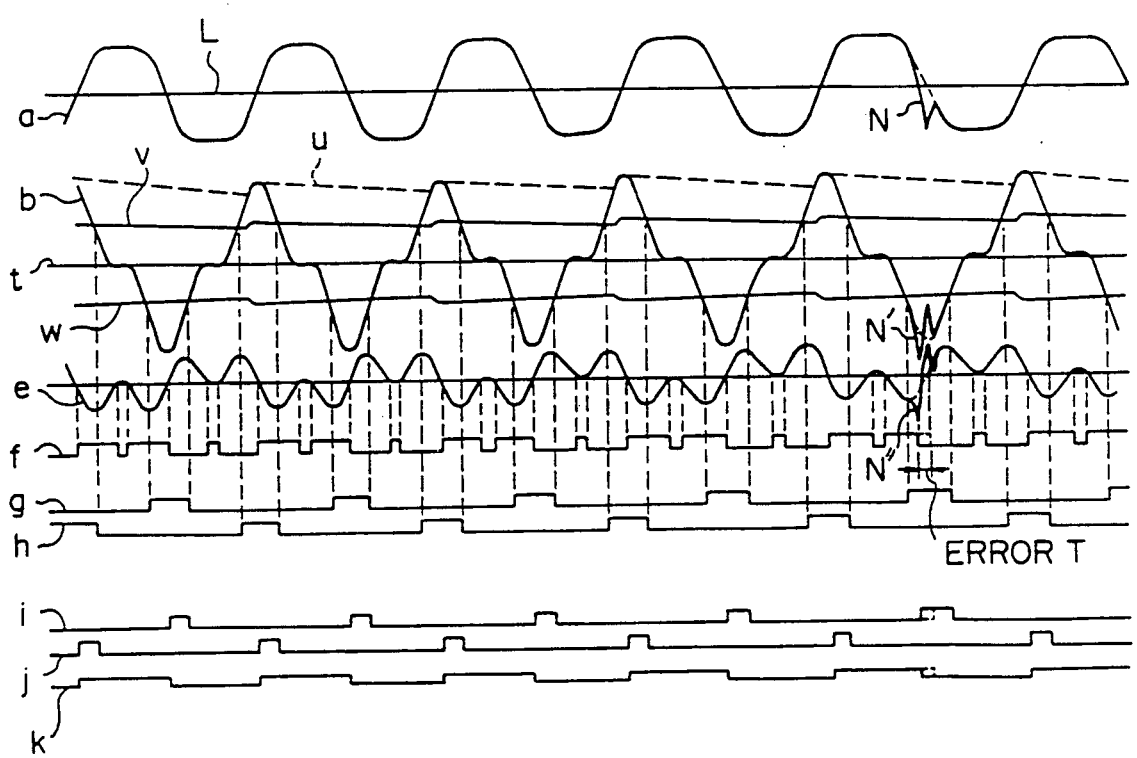
FIG. 2 is a timing diagram of the operation of the circuit shown in FIG. 1.

As explained above, in the above construction of FIG. 4, the exact timing of the transition points of the analog electric signal from the light receiving device 33 can be obtained by the process including only one differentiation of the processed signal, instead of differentiating twice as in the conventional circuit of FIG. 1. This improves the S/N ratio of the processed signal, and increases the accuracy in detecting the transition points in the analog electric signal from the light receiving device, i.e., the widths of the dark bars and light spaces.

Figure 5:
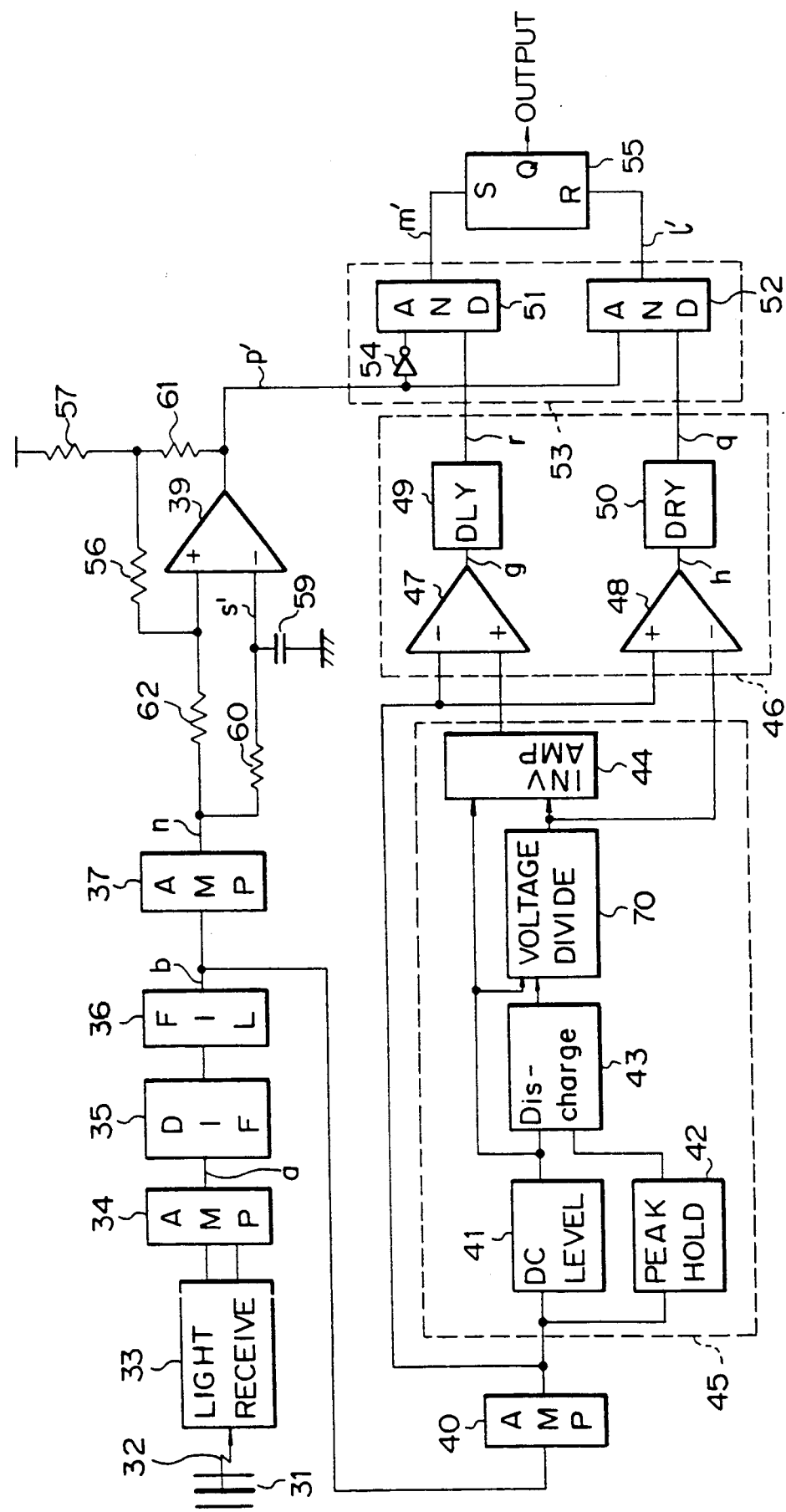
FIG. 5 is a block diagram of a second embodiment of the present invention.

FIG. 5 is a block diagram of the second embodiment of the present invention. The construction of FIG. 5 is the same as the construction of FIG. 3, except that an integrating circuit comprised of a resistor 60 and a capacitor 59 is provided in the construction of FIG. 5, instead of the delay circuit 58 of FIG. 3.

The output of the integrating circuit is denoted by "s" in FIG. 5.

Although the timing chart for the construction of FIG. 5 is not shown, the timing of the operation of the construction of FIG. 5 is almost the same as the timing shown in FIG. 4, except that the waveforms of the peaks of the above output s' of the integrating circuit are a little flat due to the integration compared with the output s of the delay circuit 58 of FIG. 3 (FIG. 4).

Further, since the high frequency noise is absorbed in the integrating circuit, the S/N ratio of the processed signal is further improved in the construction of FIG. 5.

We claim:

1. A circuit for processing an analog electric signal which is obtained from a photoelectric transformation of a reflected light when scanning a bar code by a light beam, comprising:

differentiating means for differentiating the analog electric signal;

delay means for delaying the output of said differentiating means;

first gate signal generating means for generating a first gate signal which is active when the level of the output of said differentiating means is higher than a positive threshold;

second gate signal generating means for generating a second gate signal which is active when the level of the output of said differentiating means is lower than a negative threshold;

comparing means for comparing the output of said differentiating means with the output of said delay means, the output of said comparing means being one binary level when the level of the output of said differentiating means is higher than the level of the output of said delay means, and the output of said comparing means being the opposite binary level when the level of the output of said differentiating means is lower than the level of the output of said delay means;

first gate means detecting transition points in the output of said comparing means when said first gate signal is active; and second gate means for detecting transition points in the output of said comparing means when said second gate signal is active.

2. A circuit according to claim 1, further comprising register means for being set when a transition point is detected in said first gate means, and being reset when a transition point is detected in said second gate means.

3. A circuit according to claim 1, further comprising a positive threshold generating means for generating said positive threshold, comprising:

average DC voltage level detecting means for detecting an average DC voltage level of the analog electric signal;

peak level detecting means for detecting a peak level of the analog electric signal; and discharge means for charging a voltage responding to a difference between said peak level and said average DC voltage level, and slowly discharging the charged voltage.

4. A circuit according to claim 3, further comprising negative threshold generating means for generating said negative threshold, comprising an inverting means for inverting the polarity of the output of said positive threshold generating means.

5. A circuit for processing an analog electric signal which is obtained from a photoelectric transformation of a reflected light when scanning a bar code by a light beam, comprising:

differentiating means for differentiating the analog electric signal;

integrating means for integrating the output of said differentiating means;

first gate signal generating means for generating a first gate signal which is active when the level of the output of said differentiating means is higher than a positive threshold;

second gate signal generating means for generating a second gate signal which is active when the level of the output of said differentiating means is lower than a negative threshold;

comparing means for comparing the output of said differentiating means with the output of said integrating means, the output of said comparing means being one binary level when the level of the output of said differentiating means is higher than the level of the output of said integrating means, and the output of said comparing means being the opposite binary level when the level of the output of said differentiating means is lower than the level of the output of said integrating means;

first gate means for detecting transition points in the output of said comparing means when said first gate signal is active; and second gate means for detecting transition points in the output of said comparing means when said second gate signal is active.

6. A circuit according to claim 5, further comprising register means for being set when a transition point is detected in said first gate means, and being reset when a transition point is detected in said second gate means.

7. A circuit according to claim 5, further comprising positive threshold generating means for generating said positive threshold, said positive threshold generating means comprising:

average DC voltage level detecting means for detecting an average DC voltage level of the analog electric signal;

peak level detecting means for detecting a peak level of the analog electric signal; and discharge means for charging a voltage responding to a difference between said peak level and said average DC voltage level, and slowly discharging the charged voltage.

8. A circuit according to claim 7, further comprising negative threshold generating means for generating said negative threshold, said negative threshold sensitivity means comprising inverting means for inverting the polarity of the output of said positive threshold generating means.

* * * * *

UNITED STATES PATENT AND TRADEMARK OFFICE
CERTIFICATE OF CORRECTION

PATENT NO. : 5,061,843
DATED      : OCTOBER 29, 1991
INVENTOR(S): SHINICHI SATO ET AL.

It is certified that error appears in the above-identified patent and that said Letters Patent is hereby corrected as shown below:

Col. 1,  line 46, "71" should be --$7_1$--;
         line 46, "72" should be --$7_2$--;
         line 47, "81" should be --$8_1$--.

Col. 2,  line 2, "71" should be --$7_1$--;
         line 2, "72" should be --$7_2$--.

Col. 3,  line 56, "effect noise" should be --effect of noise--.

Col. 4,  line 56, "1 block" should be --1 is a block--;
         line 65, "is timing" should be --is a timing--.

Signed and Sealed this

Second Day of March, 1993

Attest:

STEPHEN G. KUNIN

*Attesting Officer*    Acting Commissioner of Patents and Trademarks